Patented Mar. 11, 1952

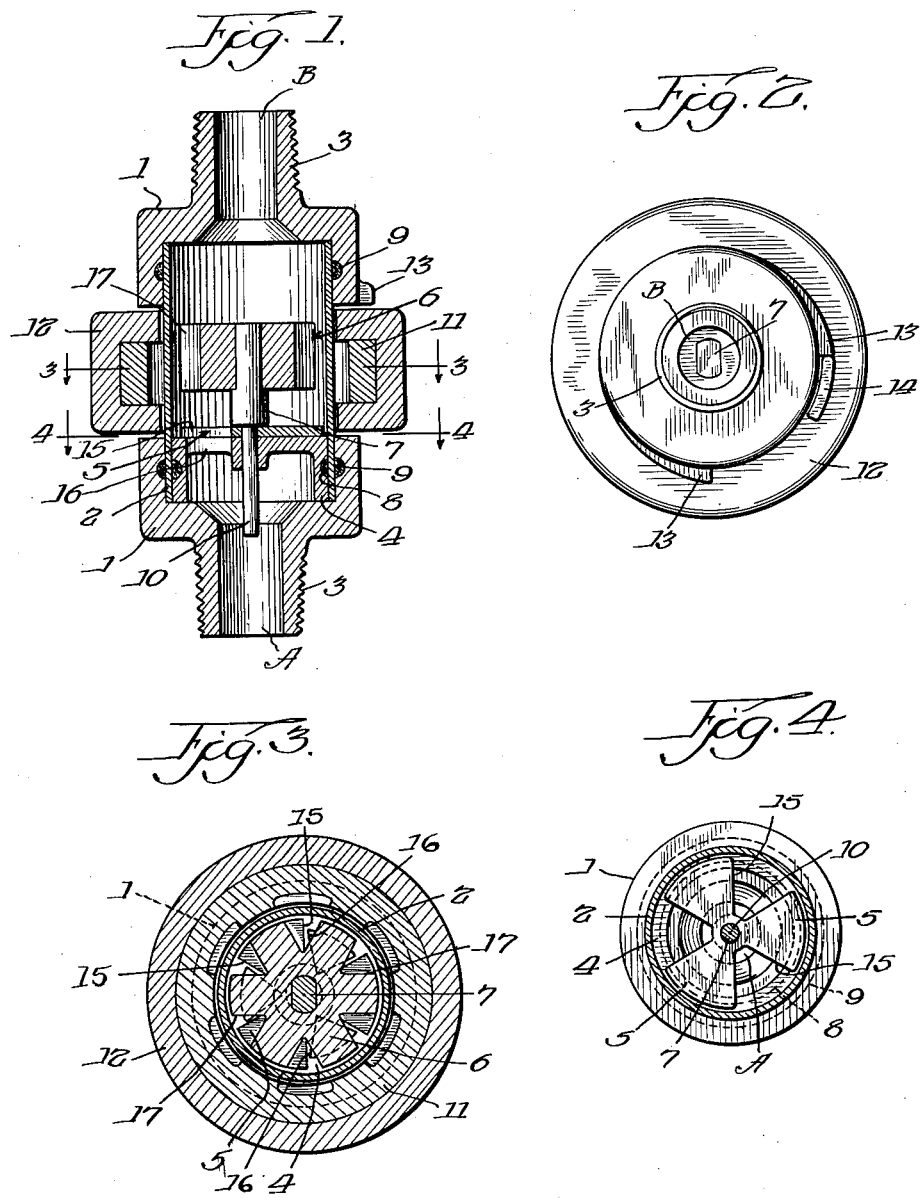

2,589,188

UNITED STATES PATENT OFFICE 2,589,188

PERMANENT MAGNET OPERATED VALVE

Edmond P. De Craene, Westchester, and Edward G. Schmidt, Western Springs, Ill., assignors to Crane Co., Chicago, Ill., a corporation of Illinois Application July 16, 1947, Serial No. 761,262

3 Claims. (Cl. 137—139)

This invention relates to a valve operating means, and more particularly it is concerned with the novel construction of a permanent magnet operated valve.

In connection with the use of permanent magnets in the operation of valves, one of the more important provisions is to avoid the use of stuffing boxes thereby eliminating the problems with respect to leakage normally occurring in the due course of time at the stuffing box and also the problems which arise in connection with hard operation due to friction of the packing itself.

Another important object is to provide a valve of the type hereinafter described in greater detail which can be used on hazardous liquids without danger to the operating personnel.

Another important object is to provide for a simplified design of permanent magnet operated valves in which there is relative simplicity of parts.

A further object is to eliminate the use of screwed or flanged bonnet joints and with it the problem inherent with the leakage at that point.

Another object is to provide for a construction in which the disc or closure member may be held to its seat without the use of springs and the like or other resilient means.

A further important object is to provide a type of valve in which there is a relatively straight through flow or stream-lined flow through the valve and in which the end members position and guide the operating ring of the valve proper.

A further object is to provide an improvement over the type of valve construction shown in the Carlson Patent 2,346,904, granted April 18, 1944.

In the instant contribution, the avoidance of threaded joints is accomplished and the use of preferably thin tubing for the body of the valve permits of a design allowing for minimum gaps between the two magnets to secure maximum rotative force effect upon the disc or closure member.

Another object is to provide for a construction which preferably permits the use of identical tail pieces at each end thereby reducing cost, controlling the rotation of the operating ring and the guide and the positions of the operating ring and the outer magnet.

Another object is to employ a construction in which the inner magnet may be offset from the outer magnet so as to allow for a magnetic force to normally hold the valve closure member to its seat and thereby eliminating the resilient member or spring heretofore required for this purpose.

A still further object is to provide in the event of sticking of the closure member and the failure of the latter to revolve, for rotation of the outer magnet to a position where like poles of the inner and outer magnets are in alignment with each other. The laterally offset position of the two magnets builds up a repelling force which tends to lift the closure member from its seat to reduce friction and thereby permit the closure member to revolve more easily.

Other objects and advantages will become more readily apparent upon proceeding with the specification read in the light of the accompanying drawings in which:

Fig. 1 is a sectional assembly view of a preferred embodiment of our invention.

Fig. 2 is a plan exterior view of same.

Fig. 3 is a sectional view taken along the line 3—3 of Fig. 1.

Fig. 4 is a sectional view taken along the line 4—4 of Fig. 1.

Referring now to Fig. 1, the tailpieces 1 provided with the inlet and outlet A and B respectively are soldered or otherwise suitably attached to the body 2, the latter preferably being made of simple tubing as indicated and thereby providing a sealed valve chamber between the tailpieces 1 and the body 2. The tailpieces are preferably provided with the end connecting threads 3 which may of course be flanged end or soldered or have welding ends added as desired. For similar reasons they may not necessary be identical in shape as presently indicated but may be of different shapes depending upon the nature of the installation. At the same time as the soldered connection is made between the body and the tailpieces by means of the rings of solder 9, the seat member 4 is preferably soldered in position by means of the ring of solder 8. The closure member or disc 5, the inner magnet 6 and the pilot stem 7 are assembled and inserted before the final sealing referred to. The pilot stem 7 is provided with lower extending guide 10.

Circular rings of solder wire may be inserted in the grooves of semi-circular cross-section shown at 8 and 9 respectively, and upon application of proper heating the solder will flow from the grooves to seal the surfaces between the body 2, the seat member 4, and the tailpieces 1. It should be obvious that other methods of joining and sealing the seat and tailpieces to the body may be used.

Before completing the soldering of the body and the tailpieces, the outer magnet 11 is placed over the tubular body 2 and preferably is enclosed by a suitable operating member 12 rotatably mounted as indicated.

Under certain conditions of operation the inner magnet 6 may require a special protective coating for resistance against corrosive fluids and the like. The inner magnet 6 is non-rotatably mounted relative to the stem shaft 7. The operating ring 12 may be made either in two pieces such as in metal or plastic and may be clamped around the outer magnet with a ring or it may be cemented to the outer magnet 11. The outer magnets are preferably of the multiple type, and are so positioned with relation to the body that the outer magnet is closest to the seat 4, thereby tending to draw the inner magnet and the disc 5 toward the valve seat. This possesses the advantage that if the friction between the closure member and the seat tends to prevent disc rotation, then rotation of the outer magnet 11 relative to the inner magnet 6 will bring like poles of each of the magnets opposite each other thus resulting in the establishment of repelling forces which tend to lift the closure member from its seat and reduce friction while permitting more easy rotation.

As shown more clearly in Fig. 2, the stops 13 and 14 on the tailpiece and operating ring respectively establish the limits of the rotation of the outer magnet 12 and also the inner magnet 6 and the closure member in the respective movements to open and closed positions.

Fig. 3 shows the general plan configuration of the respective magnets which should be understood that the latter form is optional and may be changed to suit conditions, the inner magnet 6 in the instant showing having the spaced apart relieved portions 17 as indicated.

The same flexibility applies relative to the size and shape of the recess 15 in the disc 5 and in the recess 16 in the seat 4.

Accordingly it should be apparent that the numerous details of construction may of course be varied throughout a wide range without departing from the principles and the purposes of our invention, and it is therefore not intended to limit the scope of the appended claims other than as necessitated by the prior art.

We claim:

1. In a magnetically operated valve having an inlet and an outlet, a substantially cylindrical thin tubing body, tailpiece members at each end of said body, a seat within the body adjacent one of the said tailpiece members, a closure member rotatable relative to the said seat, the said seat and closure member having complementary ports therethrough whereby the valve may be opened and closed upon suitable rotation of the said closure member in a fixed plane, an inner magnet mounted within said body and non-rotatable relative to and connected with the said closure member, an outer magnet having actuating means and mounted rotatably relative to the said body in a plane substantially below the said inner magnet and closer to the said seat, said actuating means being mounted between said tailpiece members, the thickness of tubing of said body permitting a minimum gap between the inner and outer magnets to secure maximum rotative force effect on said closure member.

2. In a magnetically operated valve, the combination comprising a substantially cylindrical body having inlet and outlet ports, end positioned means for sealing the said body, the said body having a ported valve seat stationary to the said body, a rotatable closure member movable relative to the said seat and guided by the said seat, an inner magnet non-rotatably connected to the said closure member for rotation within the said body with the said closure member, an outer magnet around the outer periphery of said body positioned in a plane below that of the said inner magnet, annularly formed actuating means for rotating the said outer magnet relative to the said body and inner magnet, the said inner magnet being positioned in the normal path of flow through the said body and having relieved portions on its outer periphery to provide ports for fluid flow between the body and magnet.

3. In a valve of the character described, the combination including a tubular casing, means for sealing the ends of the said casing, the said sealing means having ports respectively providing for the inlet and the outlet of the valve and including means for connecting to a pipe line, a seat within the casing ported to permit fluid flow therethrough, a closure member rotatably movable mounted upon the said seat and rotatably movable relative thereto, a stem connected to the said closure member, an inner magnet rotatable relative to the said casing and non-rotatably mounted relative to the said stem, an outer magnet closely mounted around the outer periphery of the said casing, actuating means therefor substantially surrounding said outer magnet, and rotatable on the tubular casing, the said outer magnet providing that upon rotation of the latter member relative to the inner magnet-like poles of each magnet are brought opposite each other whereby repelling forces lift the said closure member from its seat to facilitate easy operation.

EDMOND P. DE CRAENE.
EDWARD G. SCHMIDT.

REFERENCES CITED

The following references are of record in the file of this patent:

UNITED STATES PATENTS

| Number | Name | Date |
|---|---|---|
| 973,075 | Schlemmer | Oct. 18, 1910 |
| 1,112,992 | Dugan | Oct. 6, 1914 |
| 1,986,252 | Conran | Jan. 1, 1935 |
| 2,210,559 | Albright | Aug. 6, 1940 |
| 2,346,904 | Carlson | Apr. 18, 1944 |
| 2,405,127 | Beach | Aug. 6, 1946 |

FOREIGN PATENTS

| Number | Country | Date |
|---|---|---|
| 208,703 | Great Britain | July 10, 1924 |